United States Patent Office 3,266,248
Patented August 16, 1966

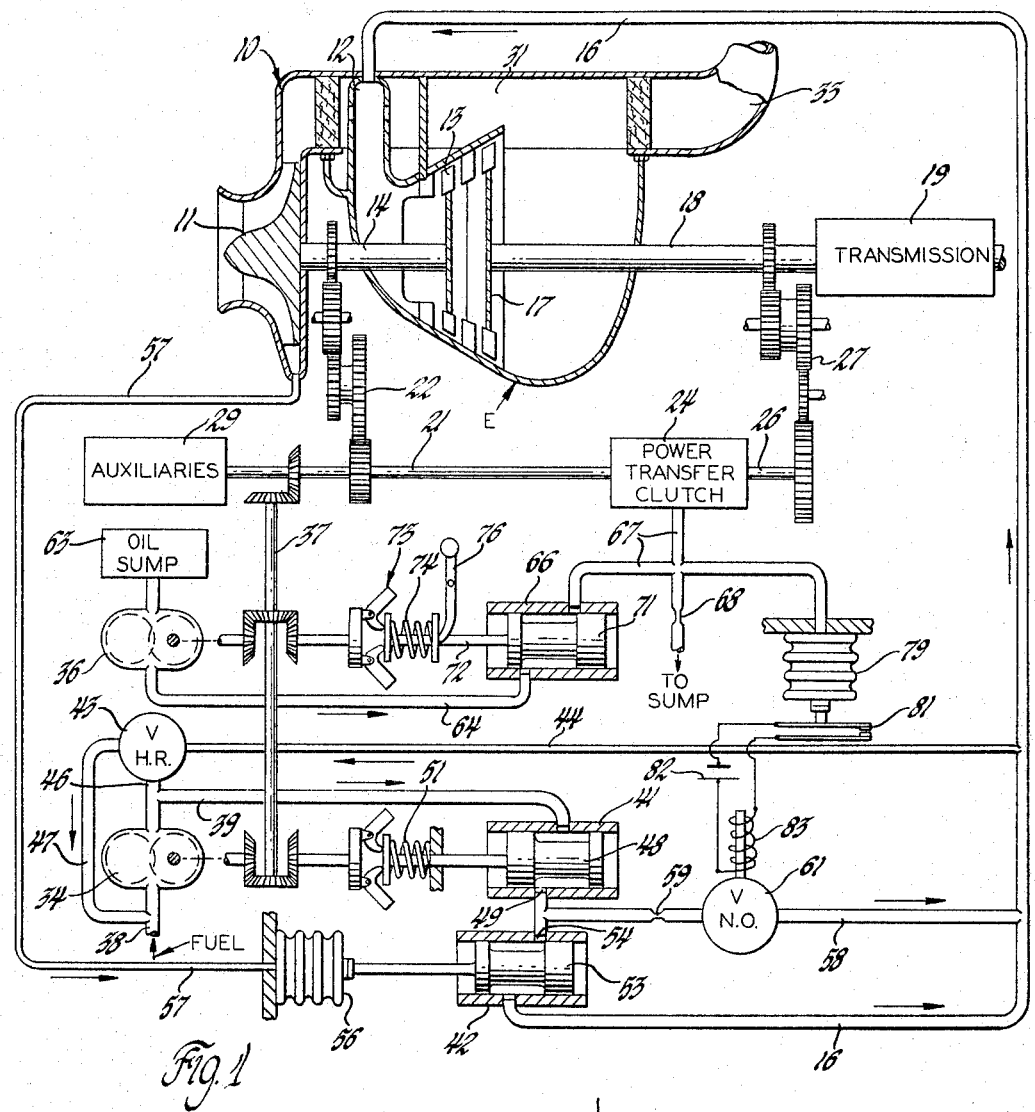

3,266,248
GAS TURBINE ENGINE FUEL AND POWER
REGULATING SYSTEM
Kenneth G. Leslie, Fenton, Mich., assignor to General
Motors Corporation, Detroit, Mich., a corporation of
Delaware
Filed Mar. 6, 1964, Ser. No. 349,969
7 Claims. (Cl. 60—39.16)

My invention relates to the control of power transfer between gas generator and power output turbines in a gas turbine engine of the free turbine type. While the nature of such an engine will be explained below, it may be pointed out that the concept of power transfer is disclosed in the U.S. patent application of Flanigan et al., Serial No. 178,121, filed March 7, 1962, of common ownership with this application. U.S. Patent No. 3,237,404 has issued on a continuation of the Flanigan et al. application (now abandoned). My invention is directed to a control of a different type from that of Flanigan et al. having some advantages, particularly in the sense of simplicity, over the power transfer control of the prior patent application.

The basic idea of power transfer as applied to a free turbine engine may be outlined here briefly as an aid to understanding the present invention. A free turbine engine embodies a gas generator, which provides hot gas under pressure, and a power turbine which derives energy from the hot gas to provide the power output of the engine. The gas generator comprises a compressor, combustion apparatus supplied by the compressor, and a turbine energized from the combustion apparatus driving the compressor. Such engines are well known, and one such is described in U.S. Patent No. 3,116,605.

In engines of this sort, the power output is controlled by varying fuel, thus varying the energization level of the gas generator. The maximum output of the engine is determined by the allowable temperature level in the gas generator. Under lower power requirements the gas generator fuel supply is decreased and, as a result, the speed of the gas generator and the temperature and mass of the motive gas which flows to the power turbine decrease. This decrease in temperature results in a lowering of efficiency of the power plant.

The concept of power transfer involves taking some power output directly from the gas generator by coupling it to the power turbine by mechanical or other power transmission devices. The natural result of this is to slow down the gas generator, but this is compensated by supplying additional fuel. The result is that the gas generator operates at a higher temperature, and for a given total shaft power output of the engine less fuel is required than when the gas generator runs without any output load as in the usual free turbine engine.

The efficacy of power transfer depends, of course, on use of some suitable means to control the power or torque extracted from the gas generator. The amount of torque available varies over the operating range of the engine. If too little torque is extracted, the maximum benefit is not achieved. If too much torque is extracted, the gas generator must run at excessive temperatures to carry the load. The specific power transfer system described in Serial No. 178,121 includes a variable-torque clutch coupling the two turbines, the torque of the clutch being controlled by the pressure of oil supplied to a clutch engaging cylinder. This oil pressure in turn is determined by a control system generating a pressure to correspond to a programmed schedule of torque transfer as a function of gas generator speed. My invention involves a different approach to power transfer control which involves a gas generator speed governor controlling the power transfer clutch and also affecting the fuel system of the engine. As a result, while certain new elements are required, a number of elements of the prior system may be eliminated.

The nature of my invention and the advantages of it will be apparent to those skilled in the art from the succeeding description of the preferred embodiment and the accompanying drawings.

FIGURE 1 is a schematic diagram of a gas turbine engine with power transfer including a control system embodying my invention.

FIGURE 2 is a diagram illustrative of fuel scheduling.

FIGURE 3 is a diagram illustrative of the operation of the power transfer control governor.

Considering first the engine E which is shown schematically and which may have any suitable structure, it includes a gas generator 10 made up of a centrifugal compressor 11, a combustion chamber 12, and a gas generator turbine including turbine wheel 13 coupled to the compressor by shaft 14. In operation, the air delivered by the compressor flows through the combustion chamber to which fuel is supplied through a line 16, and the combustion products drive the turbine wheel 13. The resulting exhaust gases pass to the power turbine including a wheel 17 fixed on the power output shaft 18. This shaft may drive any suitable load and may be coupled to the load through a power transmission 19.

The shaft 14 drives a shaft 21 through a train of accessory drive gears 22. Shaft 21, which my be referred to as a power transfer shaft, provides the input to a power transfer clutch 24. The power transfer clutch drives a shaft 26 which is coupled through a suitable train of gears 27 to the engine power output shaft 18. The shaft 21 also preferably drives various engine auxiliaries indicated at 29. The engine preferably includes a rotary generator including a regenerator drum 31 through which the compressed air flows on its way to the combustion chamber and through which the turbine exhaust flows on its way to the exhaust pipe 33.

As previously stated, the engine may be of the type described in Patent No. 3,116,605 and the elements of the power transfer system so far mentioned may be as described in application No. 178,121.

In my control system, the gas generator drives a fuel pump 34 and a servo oil pump 36, these being driven through any suitable means indicated schematically as a drive shaft 37 geared to shaft 21. The fuel system, except for a feature to be pointed out later, may be of a generally known type in which the fuel is metered and limited by means responsive to compressor discharge pressure and a governor-operated valve acts as a speed limiter or safety governor. In the usual system, the governor also controls fuel at part throttle steady-state operation, but this is not necessary in my control system. Pump 34 takes fuel from an inlet line 38 and discharges it through a line 39, a governor-controlled valve 41, and a compressor discharge pressure controlled metering valve 42 to the engine fuel supply line 16. The metering head across valves 41 and 42 is controlled by a head regulating valve 43 of any usual type which acts to maintain a constant pressure difference between lines 39 and 16. Engine fuel supply pressure in line 16 is communicated to the valve through a line 44, and the pressure upstream of the valves is communicated through the head regulating valve inlet line 46 branching off line 39. The head regulating valve bypasses any excess fuel to the pump inlet through line 47, the excess being any fuel additional to that required to maintain the predetermined pressure drop between lines 39 and 16.

The governor-controlled valve 41 may be a simple spool valve including a spool 48 which is moved to throttle outlet port 49 as gas generator speed exceeds that for which a governor 51 is set. Governor 51 may be a conventional flyweight device driven by the gas generator through shaft 37 or any other suitable mechanism. The metering valve 42 acts to increase fuel flow as engine air flow increases and essentially acts to limit the temperature of the motive fluid. A simple known way to accomplish this is to control fuel as a function of compressor discharge pressure. As indicated in this schematic, valve spool 42 includes a land 53 which opens a port 54 as compressor discharge pressure increases. To accomplish this, spool 53 is mechanically coupled to a bellows 56 to which compressor discharge pressure is supplied through a line 57 from the diffuser of the compressor 11. Port 54 may be contoured to a suitable schedule, or a contoured movable valve member may be used.

The fuel system also includes means to supplement the fuel metered by the CDP-responsive valve 42. In its simplest form, this may be no more than a conduit 58 bypassing valve 42 and having in it a fixed metering orifice or restriction 59 and a shutoff valve 61 of a normally open type. Bearing in mind that governor valve 41 normally is fully open and that the metering head is kept constant, fuel flow through the metering orifice 59 will be a constant value as long as valve 61 is open. Valve 61 is controlled by the power transfer control mechanism to be described so that, depending upon the mode of operation of the engine, the fuel supplied to the engine is that metered by valve 42 or that metered by valve 42 plus a constant flow determined by restriction 59. The significance of this will be explained after the description of the power transfer mechanism.

Considering now the control of power transfer clutch 24: in the illustrated embodiment, this is accomplished by modulating or controlling the pressure of servo oil which determines the torque capacity of the clutch. The clutch may be any suitable hydraulically engaged clutch, and particularly may embody the specific clutch structure illustrated in application No. 178,121. Oil to engage the clutch may be derived from a sump 63 and supplied under pressure by pump 36. The pump may include suitable output pressure regulating means, or a separate relief or regulating valve for the pump output may be provided. Such conventional pressure regulating devices are not illustrated. In any event, servo oil under suitable pressure is supplied through a line 64 and power transfer control valve 66 to a line 67 leading to the power transfer 24. The flow into line 67 is variably throttled by valve 66, and the power transfer clutch engaging cylinder is vented to the sump through a restricted orifice 68. Thus, the engaging pressure in the clutch is a function of the relative areas of the port of valve 66 and the fixed orifice 68 and ultimately the clutch torque is determined by valve 66. The flow is throttled by land 71 of the spool of valve 66 which is mechanically coupled through rod 72 to a variably settable speed responsive device, indicated as being a flyweight type governor 73 driven by shaft 37. Governor 73 includes a speeder spring 74, the force of which is varied by a power control lever 76 which thus determines the speed setting of governor 73 and, therefore, the relation between gas generator speed and power transfer torque.

This action is represented by FIGURE 3, in which the oil pressure supplied the clutch is the ordinate and gas generator speed is the abscissa. The curve A on FIGURE 3 may represent the relation between gas generator speed and clutch oil pressure and, therefore, the relation between gas generator speed and power transfer torque for a given setting of the governor 73. The broken line B represents the action at a different speed setting of the governor. It will be seen, therefore, that below a minimum speed value there is no power transfer and, as the gas generator reaches the speed set by the governor 73, the oil pressure rapidly increases to the maximum value.

The power transfer control reacts upon the fuel system by controlling valve 61. This may be accomplished by a pressure responsive bellows 79 which acts to close a normally open switch 81 at a relatively low level of pressure in the power transfer clutch such, for example, as may be represented by the broken line C—C in FIGURE 3. When the switch 81 is closed, it completes a circuit through a source of current indicated by cell 82 and a solenoid 83 which, when energized, closes valve 61.

Operation of the overall system may be clarified by consideration of FIGURE 2, in which the ordinate is fuel flow and the abscissa is gas generator speed or CDP. In this connection, speed, CDP, and mass air flow are all closely related, the relations between them varying with ambient conditions. In FIGURE 2, the line A represents the maximum fuel usable by the gas generator for acceleration. The line B represents the fuel required for steady-state operation with no power transfer load. In the usual operation of a gas generator it may accelerate along a fuel line such as A limited by a metering device, such as valve 42 in this disclosure, until it reaches the governor setting, whereupon the governor brings the fuel down to the steady-state operating line B along the "Fuel Governor" line. The fuel supply is then determined by the steady-state fuel requirement at the governor control point. With this sort of control, turbine inlet temperatures are lower than desired, causing reduced efficiency except at maximum or 100% gas generator speed.

My invention involves adding fuel to the gas generator so that the fuel flow curve is as shown in line C in FIGURE 2. The additional fuel above that required for steady-state operation raises gas generator temperature and provides an excess of torque capacity of the gas generator which is transferred through the controlled clutch to the power output shaft. I have found that within a usable degree of approximation curve C may be considered to differ from curve A by a constant amount. Thus, the fuel for steady-state running with power transfer may be a constant amount less than that allowable for acceleration. In the light of this relation the very simple control described above becomes feasible. Also, with this control the speed of the gas generator is controlled by a governor acting through the power transfer clutch rather than by a governor acting upon fuel supply, as is usual.

Now we may consider the operation of the fuel control and power transfer system. Assuming that the power control 76 is set to some point in the mid-range and that the engine is started by any usual mechanism; as the engine is accelerating, fuel flow is determined by the CDP-responsive valve 42 which supplies fuel in accordance with curve C. However, the valve 61 is open and orifice 59 contributes an additional amount to bring the fuel up to the acceleration limit line A. As the engine speed reaches the set point of the torque governor 73, the governor begins to open valve 66 to provide an engaging force on power transfer clutch 24. At a low value of clutch friction the pressure in line 67 is sufficient to act through bellows 79, close switch 81 and thus close valve 61. The additional fuel is thus shut off and fuel is controlled by CDP along the line C of FIGURE 2. Gas generator speed is held at the desired value by the load imposed by the torque governor, which modulates the pressure in the power transfer clutch to hold the gas generator speed constant.

If the speed or power setting is increased, this involves increasing the pressure of speeder spring 74. Valve 66 closes to disengage the power transfer clutch, thereby relieving the gas generator of the power transfer load to facilitate acceleration and thereby also opening valve 61 as the power transfer clutch pressure is reduced, so that full fuel flow for acceleration is available. Again, as speed reaches the new setting the power transfer clutch engages and the supplemental fuel is shut off. The control lever 76 thus determines the power setting of the gas generator and thus the gas horsepower available to the power turbine 18. While the system could include means to shut off fuel in the event of overspeed of the power turbine (not illustrated) this need not be included since the power transfer clutch may be operated in response to overspeed of the power turbine to brake the power turbine. Any suitable speed responsive valve actuated by power turbine speed (not illustrated) can be employed to supply servo oil to the brake cylinder of the power transfer clutch to load it to a high value of torque as explained in Serial No. 178,121.

It will be apparent that the valve 41 and governor 51 in the fuel system of FIGURE 1 serve only an overspeed protection function, since normally the gas generator speed is regulated and overspeed is prevented by the torque governor 73. It will be seen that the present system is appreciably simpler than that of Serial No. 178,121 in that it does not require means for measuring torque or programming torque, or means such as shown in that application for releasing the power transfer for acceleration.

It will be apparent that if the situation were such that the difference between curves A and C varies with engine speed or CDP rather than remaining constant within practical tolerances, the principles of this control could easily be applied. For example, in such a case, fixed orifice 59 could be replaced by a metering valve of the same character as valve 42 responding to compressor discharge pressure or, if desired, some other parameter of engine operation.

The detailed description of the preferred embodiment of the invention for the purpose of explaining the principles thereof is not to be considered as limiting the invention, since many modifications may be made within the scope of the invention by the exercise of skill in the art.

I claim:

1. A control for a free turbine type gas turbine engine having a gas generator including a turbine and having a power output turbine rotatable independently of the gas generator turbine, and including a variable-torque-controllable coupling between the said turbines, the control including means for supplying fuel to the gas generator, primary fuel control means operable to meter the fuel supplied to the gas generator to cause it to operate on a predetermined characteristic, means operative to control the torque of the said coupling, means responsive to a condition of the gas generator indicative of capability of the gas generator to assume a torque load regulating the said torque control, and means responsive to a condition indicative of minimal transmission of torque by the said coupling effective to supplement the fuel supplied by the primary fuel control to the gas generator.

2. A control for a free turbine type gas turbine engine having a gas generator including a turbine and having a power output turbine rotatable independently of the gas generator turbine, and including a variable-torque-controllable coupling between the said turbines, the control including means for supplying fuel to the gas generator, primary fuel control means operable to meter the fuel supplied to the gas generator to cause it to operate on a predetermined characteristic, means operative to control the torque of the said coupling, means responsive to the speed of the gas generator regulating the said torque control, and means responsive to a condition indicative of minimal transmission of torque by the said coupling effective to supplement the fuel supplied by the primary fuel control to the gas generator.

3. A control for a free turbine type gas turbine engine having a gas generator including a turbine and having a power output turbine rotatable independently of the gas generator turbine, and including a variable-torque-controllable coupling between the said turbines, the control including means for supplying fuel to the gas generator, primary fuel control means operable to meter the fuel supplied to the gas generator to cause it to operate at substantially constant temperature under varying power output levels, means operative to control the torque of the said coupling, means responsive to a condition of the gas generator indicative of capability of the gas generator to assume a torque load regulating the said torque control, and means responsive to a condition indicative of minimal transmission of torque by the said coupling effective to supplement the fuel supplied by the primary fuel control to the gas generator to provide additional fuel for acceleration.

4. A control for a free turbine type gas turbine engine having a gas generator including a compressor and a turbine and having a power output turbine rotatable independently of the gas generator turbine, and including a variable-torque-controllable coupling between the said turbines, the control including means for supplying fuel to the gas generator, primary fuel control means including a metering valve responsive to a condition indicative of air flow of the gas generator operable to meter the fuel supplied to the gas generator to cause it to operate on a predetermined characteristic, means operative to control the torque of the said coupling including a speed responsive device driven by the gas generator having a variable speed control setting, means actuated by the speed responsive device effective to control the torque transmitted by the said coupling, the last-named means generating a physical condition indicative of the magnitude of the transmitted torque, and means responsive to the said physical condition operating in parallel with the said fuel metering valve actuated in response to low values of power transfer torque to augment the supply of fuel to the gas generator.

5. A control as recited in claim 4 in which the condition to which the metering valve responds is compressor discharge pressure.

6. A control for a free turbine type gas turbine engine having a gas generator including a compressor and a turbine and having a power output turbine rotatable independently of the gas generator turbine, and including a variable-torque-controllable coupling between the said turbines, the control including means for supplying fuel to the gas generator, primary fuel control means including a metering valve responsive to compressor discharge pressure of the gas generator operable to meter the fuel supplied to the gas generator to cause it to operate on a predetermined characteristic, and an overspeed governor effective only on overspeed to limit the fuel supplied to the gas generator;

means operative to generate a pressure supplied to the coupling to control the torque of the said coupling including a speed responsive device driven by the gas generator having a variable speed control setting, and means responsive to the said control pressure operating in parallel with the said fuel metering valve actuated in response to low values of power transfer torque to augment the supply of fuel to the gas generator.

7. A control for a free turbine type gas turbine engine having a gas generator including a compressor and a turbine and having a power output turbine rotatable independently of the gas generator turbine, and including a variable-torque-controllable coupling between the said turbines, the control including means for supplying fuel to the gas generator, primary fuel control means including a metering valve responsive to a condition indicative of air flow of the gas generator operable to meter the fuel supplied to the gas generator to cause it to operate on a predetermined characteristic, and an overspeed governor effective only on overspeed to limit the fuel supplied to the gas generator;

means operative to control the torque of the said coupling including a speed responsive device driven by the gas generator having a variable speed control setting, means actuated by the speed responsive device effective to control the torque transmitted by the said coupling, the last-named means generating a physical condition indicative of the magnitude of the transmitted torque, and means responsive to the said physical condition operating in parallel with the said fuel metering valve actuated in response to low values of power transfer torque to augment the supply of fuel to the gas generator.

References Cited by the Examiner

UNITED STATES PATENTS 2,802,334    8/1957    Fletcher et al. _____ 60—39.16

FOREIGN PATENTS 723,368    2/1955    Great Britain.

JULIUS E. WEST, *Primary Examiner.*

UNITED STATES PATENT OFFICE
CERTIFICATE OF CORRECTION

Patent No 3,266,248                   August 16, 1966

Kenneth G. Leslie

It is hereby certified that error appears in the above numbered patent requiring correction and that the said Letters Patent should read as corrected below.

Column 2, line 28, for "my" read -- may --; line 35, for "generator" read -- regenerator --; column 3, line 46, after "transfer" insert -- clutch --.

Signed and sealed this 26th day of September 1967.

(SEAL)
Attest:

ERNEST W. SWIDER
Attesting Officer

EDWARD J. BRENNER
Commissioner of Patents